US008844575B2

(12) United States Patent
Baltes

(10) Patent No.: US 8,844,575 B2
(45) Date of Patent: Sep. 30, 2014

(54) GUIDING DEVICE FOR METAL BELLOWS

(75) Inventor: Herbert Baltes, Losheim (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 23 days.

(21) Appl. No.: 13/261,282

(22) PCT Filed: Dec. 30, 2009

(86) PCT No.: PCT/EP2009/009330

§ 371 (c)(1), (2), (4) Date: May 2, 2012

(87) PCT Pub. No.: WO2011/079851

PCT Pub. Date: Jul. 7, 2011

(65) Prior Publication Data

US 2012/0211111 A1 Aug. 23, 2012

(51) Int. Cl.
*F16L 55/04* (2006.01)
*F15B 1/10* (2006.01)

(52) U.S. Cl.
CPC ......... *F15B 1/103* (2013.01); *F15B 2201/3158* (2013.01); *F15B 2201/205* (2013.01); *F15B 2201/3153* (2013.01)
USPC ............................................... 138/30; 138/31

(58) Field of Classification Search
USPC ...................................................... 138/30, 31
See application file for complete search history.

(56) References Cited

U.S. PATENT DOCUMENTS

| | | | | |
|---|---|---|---|---|
| 6,286,552 | B1 * | 9/2001 | Shimbori et al. | 138/31 |
| 6,525,290 | B2 * | 2/2003 | Shimbori et al. | 219/91.23 |
| 8,496,030 | B2 * | 7/2013 | Baltes | 138/31 |
| 2004/0250866 | A1 * | 12/2004 | Bartsch et al. | 138/30 |
| 2010/0186843 | A1 * | 7/2010 | Wellner et al. | 138/30 |

FOREIGN PATENT DOCUMENTS

| | | |
|---|---|---|
| JP | 64-32901 | 3/1989 |
| JP | 2113139 | 4/1990 |
| JP | 02-67136 | 5/1990 |
| JP | 2195001 | 8/1990 |
| JP | 10019001 | 1/1998 |
| JP | 2006-300090 | 11/2006 |
| JP | 2009228715 | 10/2009 |

* cited by examiner

*Primary Examiner* — James Hook
(74) *Attorney, Agent, or Firm* — Roylance, Abrams, Berdo & Goodman LLP

(57) ABSTRACT

A guiding device for metal bellows (19) includes a terminal element (35) on a bellows end (31). The terminal element is movable along the wall of a housing (1) during expansion and compression of the bellows (19). A guide (47) is interposed between the terminal element and the housing (1). The guide has an annular element (47) surrounding a peripheral zone of the terminal element (35). The annular element, on its outer periphery, forms first annular sections radially spaced apart from the wall of the housing (1) and separated from each other by second annular sections radially projecting over the first annular sections.

14 Claims, 2 Drawing Sheets

GUIDING DEVICE FOR METAL BELLOWS

FIELD OF THE INVENTION

The invention relates to a guiding device for a metal bellows, which including end body on at least one end of the bellows. The end body is movable along the wall of a housing during expansion and compression of the bellows. A guide is between this end body and the housing.

BACKGROUND OF THE INVENTION

Metal bellows are used in various technical fields as a component of variable length, for example, when it is necessary to equalize the length in lines or coupling connections for flowable media. In particular, metal bellows are also often used in hydraulic accumulators as a movable separating element between the gas side and the fluid side. Especially in applications where relatively extensive movements take place during expansion and compression of the bellows, or if back and forth movements take place at a relatively high rate and/or at higher acceleration values, as is the case in pulsation dampers or shock absorbers, it is important for the service life of the bellows that the respective end of the bellows moved along a housing wall in operation be guided in a safe and reliable manner.

In this respect, the prior art provides a guide on the movable end of the bellows involved. In a prior art solution published at a later date, disclosed in German patent application DE 10 2007 036 487.5, the guide arrangement is designed such that individual guide bodies distributed around the periphery of the end body are fastened to the peripheral edge of the movable end body of the bellows. These guide bodies form sliding bodies that are guided to mate with an outer sliding surface against the wall of the housing. The sliding surfaces of these bodies are spaced radially apart from the peripheral edge of the end body. Fluid passages are then formed along the housing wall between the individual guide bodies.

These guide bodies are designed as guide shoes. When the end body is configured in the form of a cup, the guide shoes overlap the peripheral edge of the cup having a circular cylindrical side wall extending into the interior of the bellows. When the guide bodies are made of a plastic material with good sliding properties, good guide properties are attained. When the friction ratio between the guide body and the housing wall is favorable, the guide provides safe and reliable long term operation. On the other hand, the production is complex and cost intensive. The individual guide bodies are fabricated in a separate production step and have to be brought to the assembly site and mounted on the end edge of the end body of the pertinent bellows. To ensure a reliable anchoring of the guide bodies, the guide bodies are designed as guide shoes, having a profile similar to the shape of a U in the cross section, with legs that overlap the end edge of the cup-like end body. In this context, the end edge of the cup has to have a catch, and the interior of the profile of the guide shoes has to have at least one undercut to secure the guide bodies with a snap lock action. The formation of the undercuts involves a time-consuming and costly production of the guide shoes by compression molding.

SUMMARY OF THE INVENTION

An object of the present invention is to provide an improved guide distinguished by a significant simplification of the production process and, as a result, a reduction in the production costs, while at the same time retaining the good guide and operating properties of the aforementioned solution known from the prior art.

This object is basically achieved according to the present invention by a guide having an annular element surrounding a peripheral region of the end body of the bellows. The annular element forms both annular sections, which are radially spaced apart from the wall of the housing, on the outer periphery of this annular element and forms second annular sections, which are distributed over the outer periphery and project radially beyond the first annular sections. At the same time, these radially projecting annular sections form the sliding surfaces provided on the wall of the housing and separate the first annular sections radially recessed relative to these sliding surfaces from each other in the circumferential direction. A uniform annular element then assumes not only the function of the guide bodies known from the solution according to the prior art, but also takes over the formation of the fluid passages between the housing wall and the end body of the bellows at the first annular sections situated between the second annular sections and radially recessed.

Preferably, the annular element is made of a plastic material with good sliding properties, so that the result is a lightweight design that is easy to manufacture by injection molding.

In preferred embodiments, the bellows is secured at the bellows end opposite the movable end body at a retaining ring rigidly mounted on the housing and sealing off the interior of the bellows relative to the wall of the housing. That end body then forms a closure body tightly closing off the interior of the bellows at the assigned end of the bellows. This is a design is especially advantageous when the metal bellows is used as a movable separating element between the gas side and the fluid side of a hydraulic accumulator.

The arrangement can be configured in an advantageous way with the respective annular element having a ring portion forming the first annular sections and engaging a circumferential annular groove arranged on the end body. This enlargement of the distance from the guide location to the immovable end of the bellows supports the tilt resistance of the guide. Securing the annular element by snapping into an annular groove renders the assembly process especially simple and easy.

In especially advantageous embodiments, the annular element can exhibit an internal ring portion with at least one inner edge projecting radially inward into the assigned annular groove, and an external ring portion having an exterior. On annular element exterior the first and the second annular sections are formed, with the external ring portion and the first and the second annular sections having a larger axial width than the width of the annular groove and the width of the accommodated inner edge of the internal ring portion. That design of the annular element offers the possibility of forming the axial dimensions of the second annular sections formed on the external ring portion and forming the actual sliding surfaces on the housing wall, with dimensions that are axially much larger than those corresponding to the width of the annular groove securing the annular element. As a result, the sliding surfaces are expanded accordingly in the axial direction to exhibit optimal guide properties at the wall of the housing.

The arrangement can be configured in an advantageous way such that the end of the internal ring portion of the annular element lying closest to the bottom of the housing forms a radially inward projecting lip. This lip extends inward from the radially external edge region and limits the edge region to a narrow annular surface. Hence, when the device is running, a narrow, axially projecting edge region forms a contact face when making contact with the surface of the housing bottom during the fully expanded state of the bellows. When the annular element impinges on the bottom surface, the resilience of the plastic material the annular element acts as a damping element. The risk of adhering to the housing bottom is then eliminated due to the fact that the size is reduced on account of the inclined surface of the formed contact face.

Preferably, the second annular sections are arranged at equal angular distances from each other, respectively. However, for a low friction, but safe and reliable guide, preferably 4 to 12 second annular sections on the pertinent annular element are provided.

The subject matter of the invention also includes a hydraulic accumulator with an accumulator housing and a metal bellows as the movable separating element between a gas side and a fluid side. A guide for the metal bellows is provided as described above.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
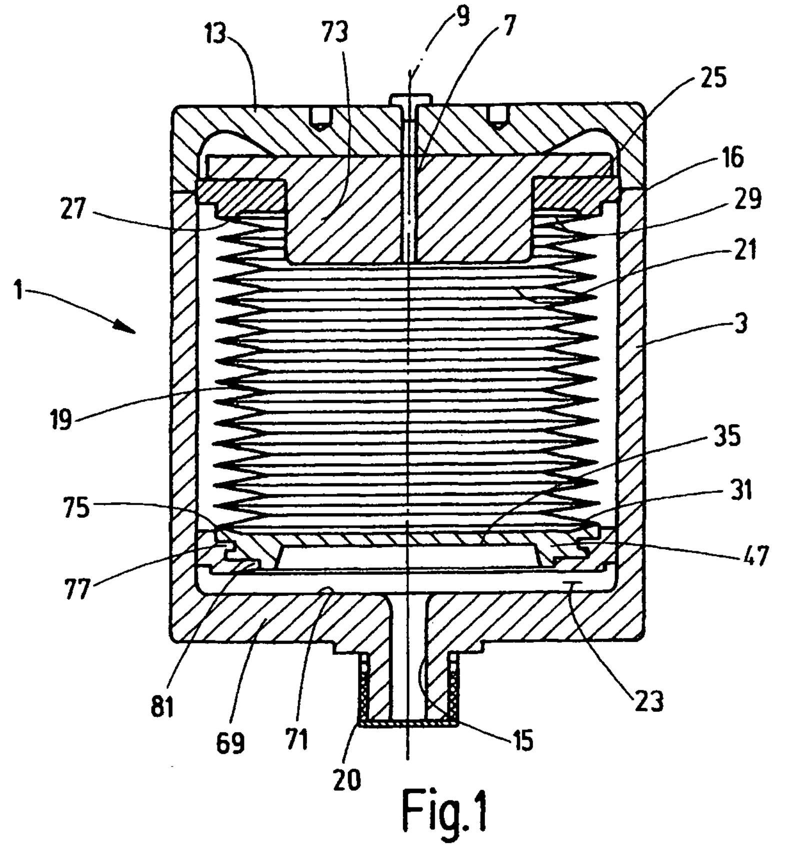
FIG. 1 is a site elevational view in sections of a hydraulic accumulator, depicted in a highly simplified schematic form and slightly reduced in size compared to a practical embodiment, with the hydraulic accumulator being provided for use as a shock absorber and having a metal bellows, serving as the movable separating element between the gas side and the fluid side and provided with a guide according to one exemplary embodiment of the invention.
Figure 2:
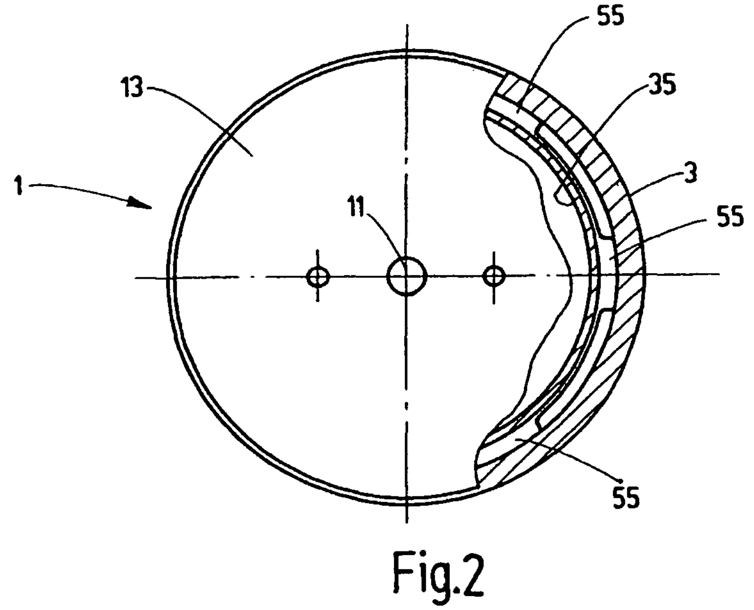
FIG. 2 is a top plan view of the hydraulic accumulator of FIG. 1 partially in section.
Figure 5:
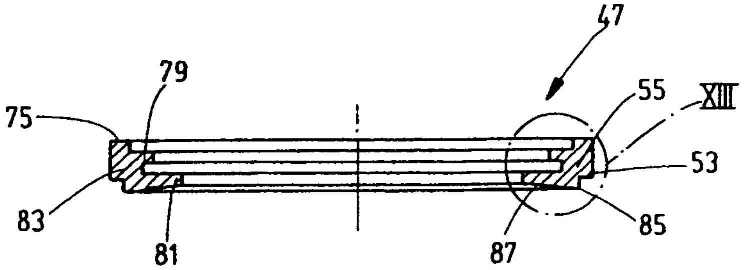
FIG. 5 is a side elevational view in section taken along line XII-XII of FIG. 4.

FIGS. 1 to 6 show an exemplary embodiment of the inventive guide in a hydraulic accumulator in the form of a shock absorber. An accumulator housing 1 comprises a main housing part 3 in the form of a circular cylindrical cup closed on the end situated at the top in the drawing, with the exception of a fill port 7. Fill port 7 is in alignment with the longitudinal axis 9 of the housing and is closed off in a fluid-tight manner by a weld nugget as shown in FIG. 1. To close the upper end of the cup, a closure part 13 is tightly welded to the main housing part 3 along a welding line 16. A fluid inlet 15 with an outer connecting pipe 17 is arranged concentrically to the axis 9 in the bottom 69 of the cup. In FIG. 1, a thread protection cap 20 is screwed onto the outer thread of the connecting pipe 17.

In the interior of the accumulator housing, a metal bellows unit forms a movable separating element between a gas side 21 bordering on the closure part 13. Gas side 21 can be filled via the fill port 7 with a working gas, preferably $N_2$, at a gas prefill pressure. In FIG. 1, the bellows 19 is in its fully expanded state, with the volume of the gas side 21 having the maximum value, whereas the fluid side 23, adjacent to the fluid inlet 15, exhibits its minimum value. The bellows unit is welded in a fluid-tight manner to a metal retaining ring 25 with the bellows end 29 being adjacent to the closure part 13 of the housing—stated more precisely, on the radially external edge of the last bellows fold. The retaining ring 25 in turn is welded to the accumulator housing at the point of separation between the closure part 13 and the main part 3 at the welding line 16. When the accumulator housing is assembled and integrated into the bellows unit, the welding line 16 therefore is heat-insulated at least to some extent from the bellows end 29 by the retaining ring 25. The weld area of the bellows end 29 at the retaining ring 25 is at the site 27 in FIG. 1, where the retaining ring 25 forms an axial bulge as the weld area.

The movable bellows end 31, lying opposite the bellows end 29 that is rigidly mounted in the housing, is welded to a metal end body 35 at the radially external end edge of the last bellows fold. This end body 35 forms a closure body that closes in a fluid-tight manner the interior of the bellows 19 and, as a result, forms the separation between the gas side 21 and the fluid side 23.

A cylindrical insert body 73 extends from the closure part 13 into the interior of the bellows 19, has the effect of suitably reducing the volume of the gas side 21 and forms at the same time an end stop abutment against which the movable end body 35 of the bellows 19 in its fully compressed state strikes. FIG. 1 shows the bellows 19 in its almost fully expanded position, in which the end body 35 is at a short distance from the flat bottom area 71 of the bottom 69.

The end body 35 has a more or less flat surface on the side facing the interior of the bellows 19, apart from a peripheral edge 75, which projects slightly in the axial direction and forms the welding spot at the assigned bellows end 31. Axially offset from the peripheral edge 75, the end body 35 forms an annular groove 77 as the seat for an internal ring portion 79 of the annular element 47 of the guide. Axially offset relative to the annular groove 77, the end body 35 forms a step with a step surface against which rests a radially inward projecting lip 81 of the ring portion 79. The annular element 47, depicted in FIGS. 3 to 6, has an external ring portion 83 connected in a radially outward manner to the internal ring portion 79. This external ring portion 83 forms the inner annular sections 51 separated from each other by outer annular sections 53 forming externally on the radially projecting guide bodies 55 the sliding surfaces for contact with the housing wall. The annular element 47 is made of a plastic material with good sliding properties and can be fabricated by turning or milling, but can also be formed as a compression molded component.

Figure 6:
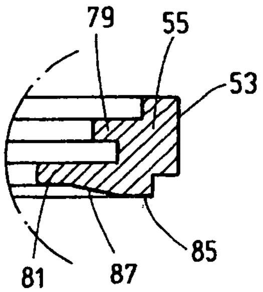
FIG. 6 is a partial side elevational view in section of the area designated as XIII in FIG. 5 and drawn on a larger scale than in FIG. 5.
Figure 4:
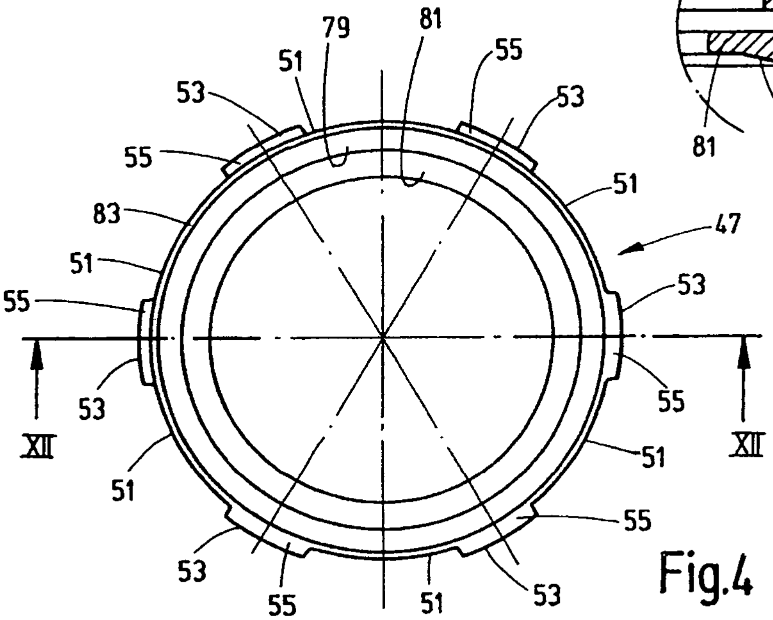
FIG. 4 is a top plan view of the annular element of FIG. 3.
Figure 3:
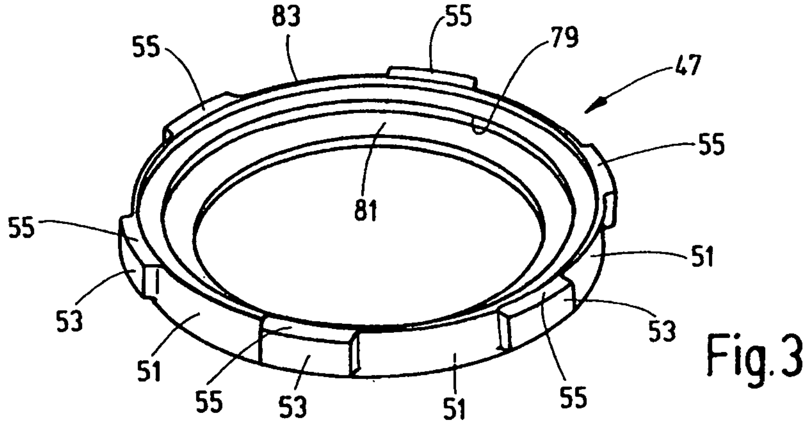
FIG. 3 is a perspective view of the annular element as of the guide of FIG. 1.

One particularity of the annular element 47 resides, as best seen in FIG. 6, in the fact that the lip 81 forms on inclined surface 87 between the radially outer end 85 and its inner end. The annular element 47 then forms a relatively narrow edge region at the end 85. Therefore, when the annular element 47 is attached to the end body 35 of the bellows, this axially projecting edge region forms the contact face at the end 85 when making contact with the bottom area 71 of the bottom 69 during the fully expanded state of the bellows 19. The resilience of the plastic material of the annular element 47 acts as a damping element when impinging on the bottom area 71. The risk of adhering to the bottom area 71 is then eliminated due to the fact that the size is reduced on account of the inclined surface 87 of the formed elevation area. Not only can the guide provide support, but also the bellows body, in particular in its end regions, can provide support. As a result, the overall axial length of the guide could then be shorter.

In the event that the diameter of the bellows 19 is large, a plurality of annular sections 53 would be necessary to provide support than would be the case for bellows having smaller diameters. In the event of a very small diameter, three annular sections 53 arranged offset by 120° from each other, respectively, are provided at the annular element 47.

An additional particularity resides in the fact that the guide bodies 55 and, thus, the sliding surfaces formed by the outer annular sections 53 exhibit a much larger axial length than would be the case with an annular element 47 forming a flat ring.

When the hydraulic accumulator provided with the guide or guiding device according to the invention is used as a pulsation damper, the fluid side 23 is in fluid connection with a pressure fluid, in particular a hydraulic fluid, a fuel, or lubricant, by way of the inlet 15, to stabilize any pressure surges. In this context, it has proven to be practical if, as disclosed in DE 10 2004 004 341 A1, the gas side 21 is filled not only with a working gas, but also with a specifiable volume fraction of a fluid. In this case, it has proved to be especially advantageous for the gas side 21 of the accumulator to have as the filling a combination of nitrogen gas as the working gas and ethylene alcohol as the fluid. In operation, the fluid can form a damping support medium between the folds and the deflections of the bellows 19. This damping support medium can provide support as an abutment for the folded wall portions of the bellows 19 at the fluid. This feature extends the service life of the bellows and, thus, enhances the operational reliability. The same advantage applies, in particular, to rapid pulsations and fast pressure surges.

While one embodiment has been chosen to illustrate the invention, it will be understood by those skilled in the art that various changes and modifications can be made therein without departing from the scope of the invention as defined in the appended claims.

The invention claimed is:

1. A guide for a metal bellows, compromising:

an end body on a bellows end and movable along a wall of a housing during bellows expansion and compression, said end body having a circumferential annular groove therein, said groove being closed on each axial end thereof and being radially open, said end body forming a closure body closing an interior of the bellows in a fluid-tight manner and forming a separation between a gas side and a fluid side in the housing, said bellows and said end plate being separate members;

at least one annular element surrounding a peripheral region of said end body and having a ring portion engaged within said annular groove;

first annular sections being formed by said annular element, being on an outer periphery of said annular element and being radially spaced from the wall of the housing;

second annular sections being formed by said annular element, being distributed on said outer periphery of said annular element, separating said first annular sections from one another and projecting radially beyond said first annular sections.

2. A guide according to claim 1 wherein said annular element is made of a plastic material with good sliding properties.

3. A guide according to claim 1 wherein said bellows is secured at a fixed bellows end lying opposite a movable bellows end by a retaining ring rigidly mounted in the housing, said retaining ring sealing said interior of said bellows relative to the wall of said housing.

4. A guide according to claim 1 wherein said annular element comprises an internal ring portion with at least one inner edge projecting radially inwardly into said annular groove and comprises an external ring portion having an extension, said first and second annular sections being formed on said external ring portion and have an axial width larger than an axial width of said annular groove and an axial width of said inner edge of said internal ring portion.

5. A guide according to claim 4 wherein an end of said internal ring portion lying closest to a bottom of the housing forms a radially inwardly projecting lip extending inwardly from a radially external edge region and limiting said edge region to a narrow annular surface.

6. A guide according to claim 1 wherein said second annular sections are arranged at equal angular distances from each other.

7. A guide according to claim 6 wherein three to twelve second annular sections are on said annular element.

8. A hydraulic accumulator, comprising:

an accumulator housing with a gas side and a fluid side therein;

a metal bellows providing a movable separating element in said housing between said gas side and said fluid side; and a guide on said metal bellows, said guide including an end body on a bellows end and movable along a wall of a housing during bellows expansion and compression, said end body having a circumferential annular groove therein, said groove being closed on each axial end thereof and being radially open, said end body forming a closure body closing an interior of the bellows in a fluid-tight manner and forming a separation between a gas side and a fluid side in the housing, said bellows and said end plate being separate members;

at least one annular element surrounding a peripheral region of said end body and having a ring portion engaged within said annular groove;

first annular sections being formed by said ring portion, being on an outer periphery of said annular element and being radially spaced from the wall of the housing; and second annular sections being formed by said annular element, being distributed on a said outer periphery of said annular element, separating said first annular sections from one another and projecting radially beyond said first annular sections.

9. A hydraulic accumulator according to claim 8 wherein said annular element is made of a plastic material with good sliding properties.

10. A hydraulic accumulator according to claim 8 wherein said bellows is secured at a fixed bellows end lying opposite a movable bellows end by a retaining ring rigidly mounted in the housing, said retaining ring sealing said interior of said bellows relative to the wall of said housing.

11. A hydraulic accumulator according to claim 8 wherein said annular element comprises an internal ring portion with at least one inner edge projecting radially inwardly into said annular groove and comprises an external ring portion having an extension, said first and second annular sections being formed on said external ring portion and have an axial width larger than an axial width of said annular groove and an axial width of said inner edge of said internal ring portion.

12. A hydraulic accumulator according to claim 11 wherein an end of said internal ring portion lying closest to a bottom of the housing forms a radially inwardly projecting lip extending inwardly from a radially external edge region and limiting said edge region to a narrow annular surface.

13. A hydraulic accumulator according to claim 8 wherein said second annular sections are arranged at equal angular distances from each other.

14. A hydraulic accumulator according to claim 13 wherein three to twelve second annular sections are on said annular element.

* * * * *